United States Patent [19]

Hamrelius et al.

[11] Patent Number: 5,604,346
[45] Date of Patent: Feb. 18, 1997

[54] ARRANGEMENT FOR RECORDING AN IR-IMAGE

[75] Inventors: Torbjorn Hamrelius, Stockholm; Ulf Guldevall, Taby, both of Sweden

[73] Assignee: Agema Infrared Systems AB, Danderyd, Sweden

[21] Appl. No.: 343,471
[22] PCT Filed: May 25, 1993
[86] PCT No.: PCT/SE93/00457
  § 371 Date: Jan. 17, 1995
  § 102(e) Date: Jan. 17, 1995
[87] PCT Pub. No.: WO93/24814
  PCT Pub. Date: Dec. 9, 1993

[30] Foreign Application Priority Data

May 25, 1993 [SE] Sweden ................................. 9201655

[51] Int. Cl.$^6$ ........................... G01J 5/06; G01J 5/52
[52] U.S. Cl. .............................. 250/252.1; 250/332
[58] Field of Search ............................ 250/332, 334, 250/370.08, 252.1 A

[56] References Cited

U.S. PATENT DOCUMENTS

| | | |
|---|---|---|
| 3,895,182 | 7/1975 | Trilling . |
| 4,331,874 | 5/1982 | Duncan et al. . |
| 4,419,692 | 12/1983 | Modisette et al. . |
| 4,933,555 | 6/1990 | Smith ................................ 250/252.1 X |
| 5,023,459 | 6/1991 | Osborn et al. ............................ 250/332 |
| 5,276,321 | 1/1994 | Chang et al. ............................ 250/226 |
| 5,371,358 | 12/1994 | Chang et al. ..................... 250/252.1 X |

FOREIGN PATENT DOCUMENTS

| | | |
|---|---|---|
| 2225914 | 6/1990 | United Kingdom . |
| 2242741 | 10/1991 | United Kingdom . |

*Primary Examiner*—Carolyn E. Fields
*Assistant Examiner*—Edward J. Glick
*Attorney, Agent, or Firm*—Young & Thompson

[57] ABSTRACT

An arrangement for recording an IR image of an object. The arrangement has a focal plane array (FPA) of IR detectors and an optic which images the object on the focal plane IR detector array. At least one temperature reference is arranged in the beam path of the focal IR detector array. At least one IR reference detector is assigned as a reference among the IR detector elements in this array. Each temperature reference is coordinated with at least one of the IR reference detector elements so that each of the IR reference detector elements is impinged upon by radiation deriving essentially solely from one of the temperature references. An IR detector reference output signal is intended to be produced for each temperature reference. Each IR reference output signal is intended to set an individual reference level for the output signals from the remaining IR detector elements in the IR detector array.

8 Claims, 2 Drawing Sheets

ARRANGEMENT FOR RECORDING AN IR-IMAGE

BACKGROUND OF THE INVENTION

1. Field of the Invention

The present invention relates to an arrangement for recording an IR-image of an object.

DESCRIPTION OF THE RELATED ART

Hitherto, IR-cameras have been constructed with optical scanning systems provided with rotating and/or oscillating scanning components. These systems scan an object and direct the beam path onto only a few detectors which are responsive to infrared light, these detectors producing a varying video signal which can be recorded on a TV-type screen. In recent times, however, a new technique has been introduced in which image scanning is effected with a focal plane array of detectors placed in an image plane, instead of using movable components. According to this new technique, each pixel itself creates an individual detector element. Although this technique was initially expensive, it has now begun to reach reasonable price levels. Neither is the technique completely novel, since a number of FPA-systems are available, although it is primarily the different detector materials which distinguish from one another. For instance, the detector elements may be pyroelectrical, Schottky Ptsi, InSb, MCT, PbSe, GaAs, etc. This type of technique is used particularly in military systems.

That which primarily distinguishes IR-cameras for civilian use, particularly those cameras retailed by Applicant's AGEMA INFRARED SYSTEMS AB, from at least the majority of military systems, is that the military systems solely show a picture of the temperature distribution of scanned objects, whereas IR-cameras for civilian use also measure the temperature at all pixels or picture elements.

Consequently, an IR-camera intended for civilian use will have higher demands on absolute temperature accuracy than the military systems. Accordingly, the IR-camera has incorporated temperature references which are moved automatically into the beam path of the detector or the detector elements at least once with each image and the IR-camera is self-calibrating in accordance with these references.

The FPA-systems hitherto presented commercially include no actual temperature references, and neither can they measure temperature particularly well. On the other hand, the FPA-systems often include a disc of uniform temperature which can be brought into the beam path, often automatically at given time points, so as to enable all of the detector elements to be calibrated to deliver the same output signal when they look at object points that have the same temperature. Variants of the FPA-system are also found in which it is possible to look with the entire camera onto an external, heated disc, so as to enable the amplification from each individual detector element, i.e. each pixel, to be calibrated.

However, the intention with the aforesaid temperature adjusting arrangements of FPA-systems is solely to ensure that the best possible picture or image is obtained, which is fulfilled when all detector elements deliver an equally large output signal for an equally large radiation signal. This intention has nothing whatsoever to do with measuring temperature.

SUMMARY AND OBJECTIONS OF THE INVENTION

The main object of the invention is to provide an which has temperature measuring properties.

Another object of the invention is to render all of the detector element output signals independent of detector temperature, long-term operation, the intrinsic temperature of the camera (background radiation), the temperature of a disc inserted into the beam path at given time points, etc.

BRIEF DESCRIPTION OF THE DRAWINGS

The invention will now be described in more detail with reference to the accompanying drawings, in which.

DESCRIPTION OF THE PREFERRED EMBODIMENTS

Figure 1:
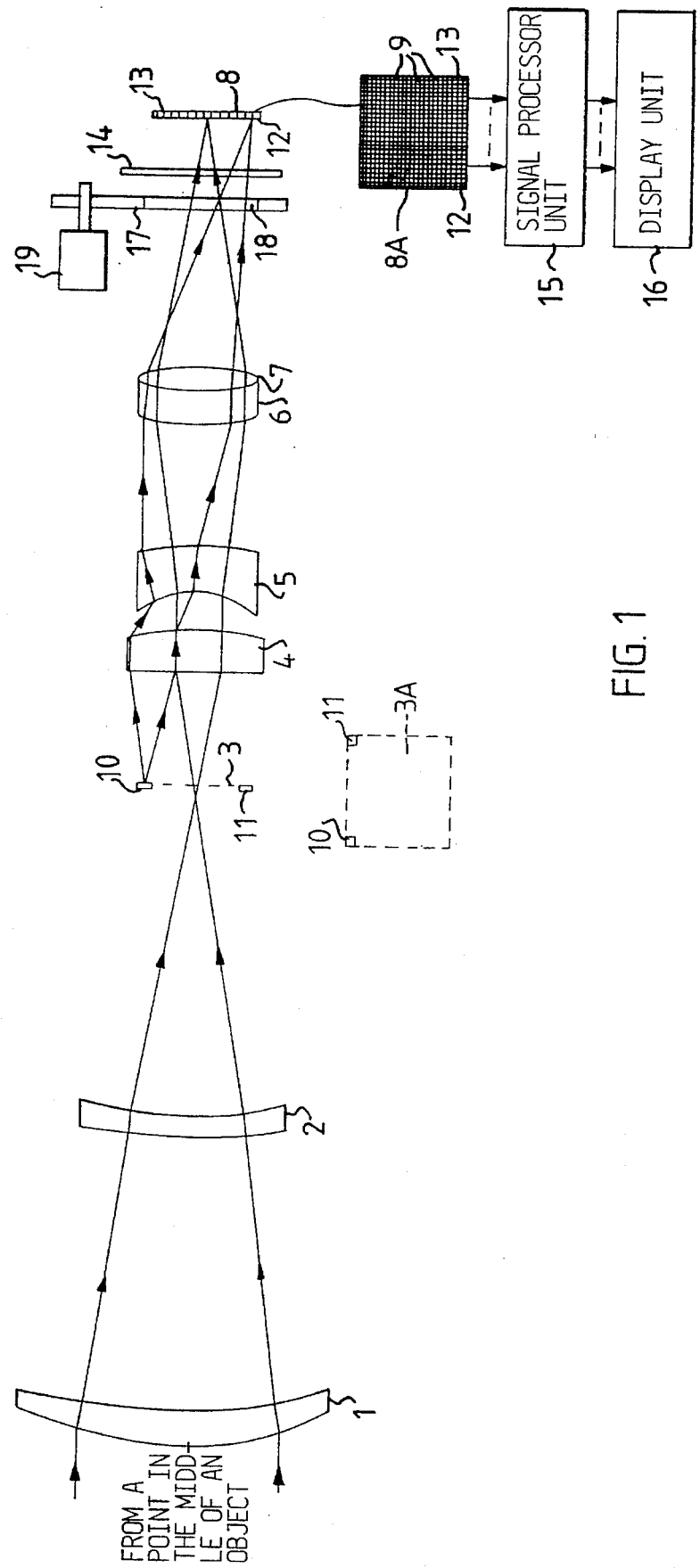
FIG. 1 illustrates schematically an optical array with a given beam path of a first embodiment of the inventive arrangement.

The FPA-system illustrated in FIG. 1 includes an objective arrangement which is comprised of two lenses 1 and 2 which form an intermediate picture or image 3 of an object to be examined. A relay optical arrangement comprised of a system of lenses 4–7 generates an image on an array 8 of IR-detector units 9, i.e. on an FPA-unit. It is to be noted that both the objective optic and the relay optic are shown solely by way of example of suitable optics in an IR-camera, and that other types of optics can be used, for instance mirror optics instead of lens optics. Since this is well known to one skilled in this art and since the actual type of optic used has no significance with respect to the concept of the invention, no other type of optic will be illustrated or described.

In the embodiment illustrated in FIG. 1, there is shown two temperature references 10 and 11 inserted in the intermediate image 3 with the positioning indicated in the broken line square 3A, which shows the format of the intermediate image. These temperature references are imaged on specific fields 12 and 13 respectively on the Ir-detector array 8, as illustrated in a plan view 8A. It will be seen from the plan view that the fields 12 and 13 may include more than one detector element in the array, for instance four detector elements in the case of the illustrated embodiment. The object is imaged through the line system 1–7, point-by-point on the remaining IR-detector elements in the array or group. Since an FPA-unit is cooled, the unit is seated in a Dewar-vessel containing liquid nitrogen, behind a window 14 in a known, conventional manner.

In that case when each temperature reference 10, 11 is imaged on several IR-detector elements, an average value is formed from the signals obtained from the detector elements 12 which detect the temperature from the one temperature reference 10, and another average value is formed of the signals obtained from those detector elements 13 which detect the temperature from the temperature reference 11. The temperature references 10 and 11 will preferably have mutually different temperatures. The average value signals each set a respective reference level for the output signals from the remaining IR-detector elements in the IR-detector array.

Adaptation to and scale division between the reference levels for the signals from the remaining detector elements in the FPA-unit is effected in a signal processor unit 15, to which the output signals of the IR-detector elements are applied. The signal processor unit 15 is preferably a computer or microprocessor, e.g. of the 68000 series. FPA-units intended for use in systems are often sold together with a processor unit. The inventive arrangement involves a change of the software of the associated processor unit.

The signal processor unit 15 delivers output signals to a display unit 16, which illustrates a thermal image of the object while disclosing temperatures or temperature ranges for different parts of the image.

It is also often convenient to be able to calibrate the detector elements against one another. If a pyroelectrical detector array is used, it is necessary to modulate the pyroelectrical detector elements. In most cases, this is achieved with the aid of a so-called chopper, which has the form of a disc 17 of uniform temperature which is rotated by means of a motor 19. A single point calibration is most often made against this chopper, so as to obtain a mutually equal signal for all detector elements. The disc is provided with at least one, often two diagonally opposed apertures 18 adapted for the beam path of an image for detection by the FPA-unit. This is, in itself, a well-known technique with FPA-units, but is also used in the present invention to calibrate the detector elements against one another. Such a chopper is required for pyroelectrical detectors and should then be placed either between the lens 7 and the window 14, as shown in FIG. 1, or between the lenses 5 and 6. When using detectors of the type Schottky PtSi, InSb, MCT, GaAs, PbSe, etc., a chopper may also be placed close to the lens 1, since it is not fully necessary for the IR-reference detector elements to be included by this calibration. It is only when the detector elements are very similar to one another in the manufacturing process that no calibration at all is required. In some instances, calibration is necessary only in the initial stage of manufacture.

Figure 2:
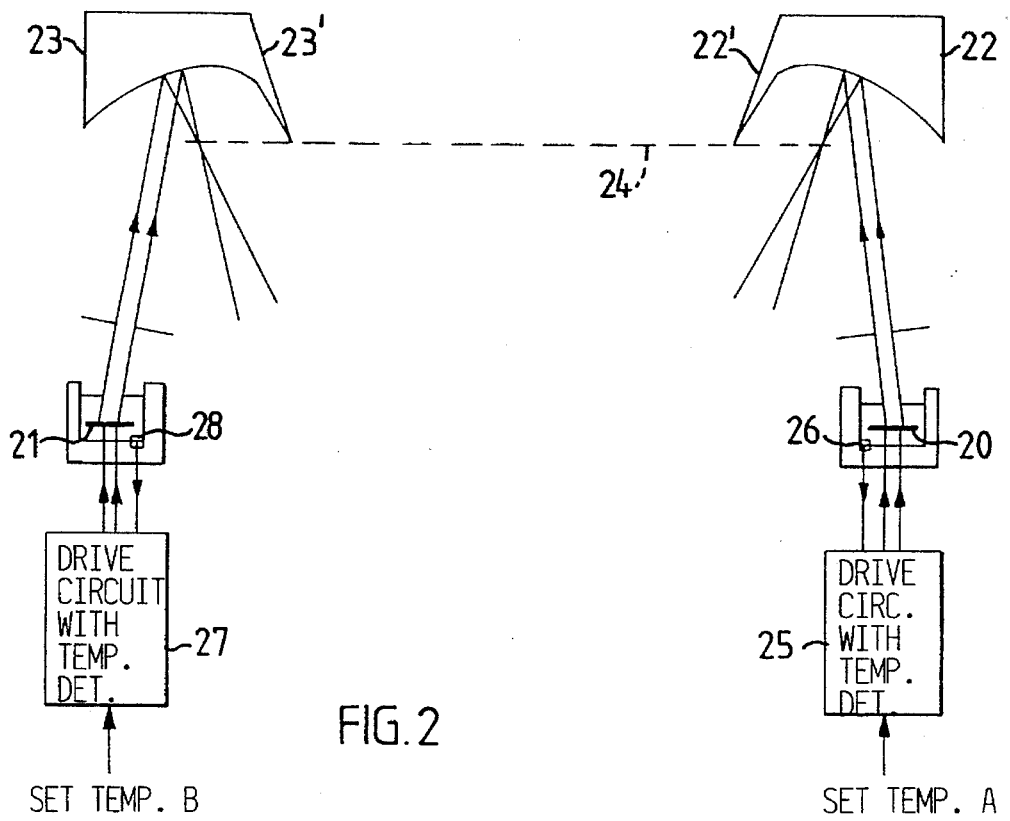
FIG. 2 illustrates schematically an exemplifying embodiment of a temperature reference arrangement with associated optics in accordance with the invention.

FIG. 2 illustrates an embodiment in which each of temperature references 20, 21 are imaged by a respective concave mirror 22 and 23 on an image plane 24 corresponding to the image plane 3 of the FIG. 1 embodiment, this image plane then being imaged on an FPA-unit (not shown) through the medium of a relay optic. Although the imagine plane 24 is shown as flat in the Figure, it will be understood that the plane may, in reality, be curved. The beam path from the temperature references is collimated conveniently with some type of optical arrangement, in the present case illustrated solely by a diaphragm which gives a small aperture angle. The concave mirrors are suitably provided with a tongue 22' and 23', respectively, having a point which is tangential to the image plane 24, so that a screening effect will be obtained between the beam path between said mirrors 22 and 23 from the object and the beam paths from the temperature references 20 and 21. This minimizes the risk of detectors on the FPA-unit, which shall only be influenced by radiation from the temperature references, being influenced also by radiation from the object, and vice versa.

In the embodiment illustrated in FIG. 2, it is also shown that the temperatures of the respective temperature references 20 and 21 can be made variable in a controlled fashion. A drive circuit 25 is connected to the temperature reference 20. The temperature of the reference 20 is detected by a sensor 26 and the output signal of the sensor is delivered to the drive circuit so as to adjust the temperature of the reference 20 to an established value. A control signal which denotes a desired, established temperature value A is delivered to a control input on the drive circuit 25, suitably from a computer, which carries into effect the IR-camera control of incorporated circuits and which coacts with operator manoeuvered control means (not shown) in a conventional manner. The temperature reference 21 is driven by another drive circuit 27 and has a sensor 28 with the same functions as those described above. The drive circuit 27 is supplied with a control signal which denotes another desired, established temperature value B. Control circuits of this kind are well known to the person skilled in this art and will therefore not be described in detail here.

It is to be noted that one of the temperature references may be a cooling element, which is thus cooled with the aid of the drive circuit and is servo-regulated to a desired temperature level. It is also possible to control the temperature references variably in time during an imaging process, such that the temperatures of the references will increase, e.g., ramp-wise, or have a sawtooth-like varying temperature. In such a case, only one temperature reference is actually required, for instance only the reference 20 in FIG. 2. As will be understood, it is also possible to use both a cooling element and a heating element with time-varying temperatures as temperature references.

Figure 3:
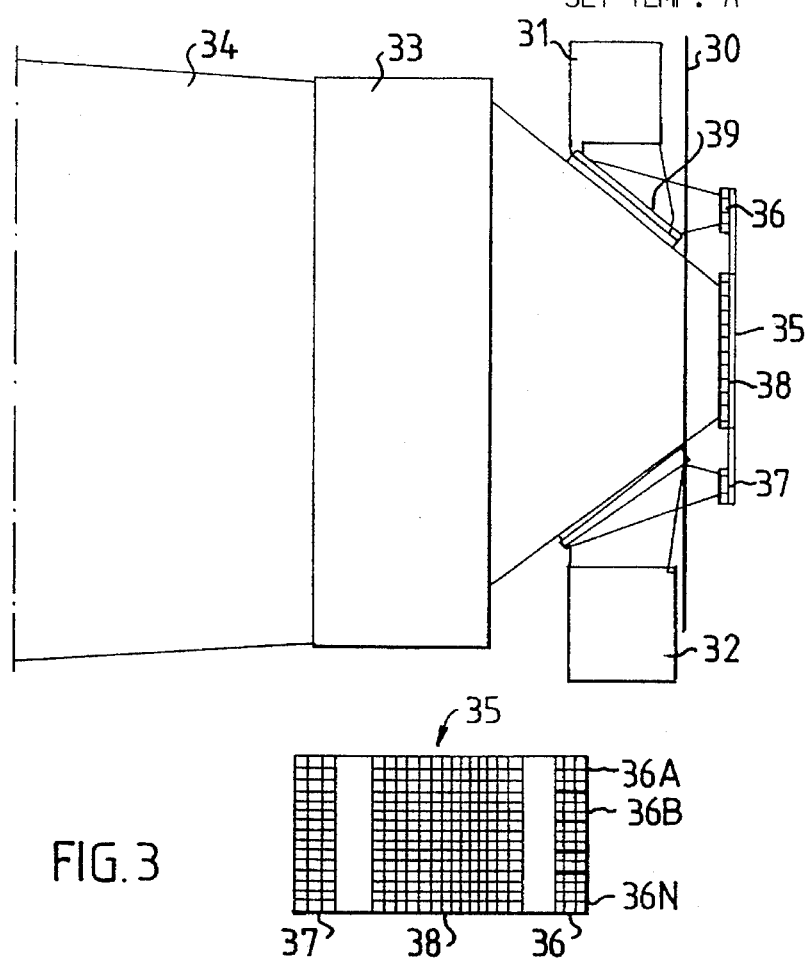
FIG. 3 illustrates a third exemplifying embodiment of the inventive temperature reference arrangement.

In the embodiment illustrated in FIG. 3, it is shown that a block 31 and 32, each having one or more temperature references may be placed completely separate from a lens system 33 for the beam path 34 from the object to the FPA-unit 35 positioned behind a window 30.

Furthermore, in the case of the illustrated embodiment, the IR-reference detector elements 36, 37 of the FPA-unit may be placed separately from the IR-detector elements 38 for imaging the object. It applies in general with all of the illustrated embodiments that the IR-reference detector elements can either be included as an integral part of an IR-detector matrix or may be separate from the IR-detector matrix for imaging. The only essential criterion is that the IR-reference detector elements are positioned so as to have the same attemperated environment.

The block 31 emits from at least one temperature reference (not shown) a beam path which is deflected by an oblique, flat mirror 39 onto the IR-reference detector elements 36 and focused at least in the vicinity thereof. The block 31 may include several temperature references, and an optic arrangement in the block 31 may focus each of these references onto separate part-arrays of IR-reference detector elements 36A, 36B . . . 36N. Thus, there is obtained for each of these part-arrays a separate reference temperature level to which a signal processor unit (not shown) corresponding to the unit 15 in FIG. 1 can adapt the output signals from the remaining detector elements. The same applies to the block 32 and the IR-reference detector elements 37.

The feature particularly illustrated in FIG. 3 is that the temperature references need not necessarily be placed in an intermediate image, but may instead be placed very close to the IR-reference detector elements.

It will be understood that many modifications are possible within the scope of the invention. The different properties and facilities illustrated in the different exemplifying embodiments can, in many cases, also be utilized in embodiments other than those illustrated and described.

We claim:

1. An arrangement for recording an IR-image of an object, comprising:

a focal plane array (FPA) of IR-detectors;

an optic which images the object on the focal plane IR-detector array;

at least one temperature reference (10, 11; 20, 21) arranged in a beam path to the IR-detector array;

at least one IR-reference detector (12, 13; 36, 37) assigned as a reference among the IR-detectors in said array;

each of said at least one temperature reference being coordinated with at least one of the at least one IR-reference detector, so that each of the at least one IR-reference detector will be impinged upon by radiation derived substantially only from one of the at least one temperature reference; an IR-reference detector output signal being produced for each of said at least one temperature reference; each IR-reference detector output signal setting an individual reference level for output signals from remaining IR-detectors in said IR-detector array.

2. An arrangement according to claim 1, wherein each said at least one temperature reference has a mutually different temperature and is arranged in a predetermined position in the array.

3. An arrangement according to claim 1, wherein said at least one IR-reference detector (12, 13) is integrated with the IR-detectors.

4. An arrangement according to claim 1, wherein said at least one IR-reference detector (36, 37) is disposed separately from the remaining said IR-detectors in said array.

5. An arrangement according to claim 1, further comprising at least one calibrating unit (17) having a specific temperature and intended for insertion into a beam path of all of said IR-detectors in said array for calibrating the arrangement; and wherein all of said IR-detectors in said array are calibrated against one another when said at least one calibrating unit is inserted in the beam path, thereby producing mutually equal output signals.

6. An arrangement according to claim 1, wherein a temperature of each of said at least one temperature reference is variably selected.

7. An arrangement according to claim 6, wherein the temperature of said at least one temperature reference is variable in time in accordance with a predetermined pattern.

8. An arrangement according to claim 7, wherein said predetermined pattern is one of a ramp pattern and a sawtooth pattern.

* * * * *